May 24, 1932.    C. L. KENNEDY    1,859,369
INDUCTION MOTOR
Filed Nov. 8, 1930

Witness
Paul F. Bryant

Inventor
Carlton L. Kennedy
by his attorneys
Van Brunt, Fish, Hildreth & Cary

Patented May 24, 1932

1,859,369

UNITED STATES PATENT OFFICE

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS

INDUCTION MOTOR

Application filed November 8, 1930. Serial No. 494,386.

The present invention relates to induction motors and more particularly to single phase induction motors and starting means therefor.

The object of the present invention is to provide a multiple-speed, changeable-pole induction motor with starting means effective on any of the connections.

With this object in view, the present invention consists in the method hereinafter described and particularly defined in the claims.

Figure 1:
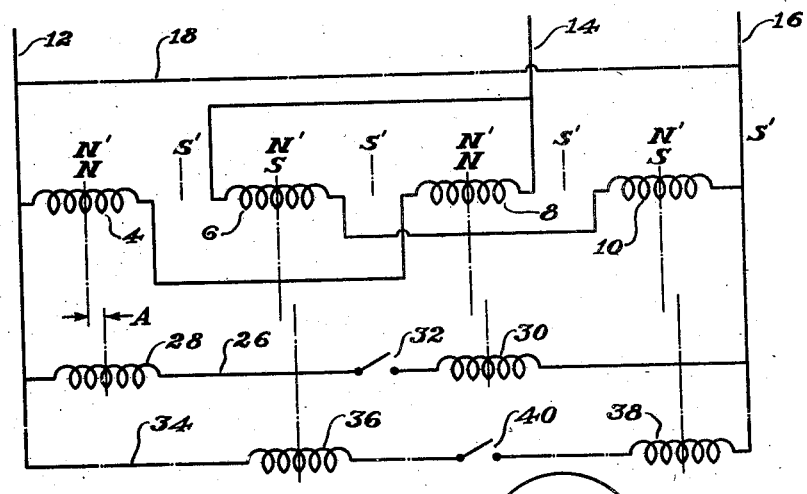
Figure 2:
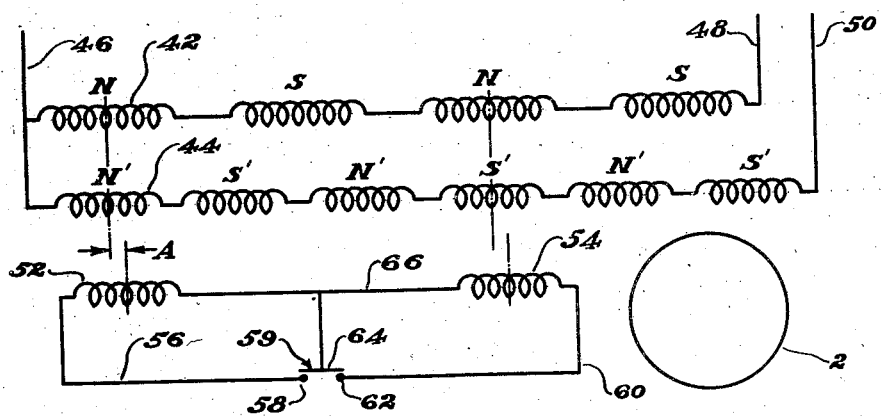

In the accompanying drawings, Fig. 1 is a diagram of the consequent pole induction motor according to the present invention; and Fig. 2 is a diagram of another form of changeable-pole motor.

The invention is herein illustrated and described as embodied in two forms of motors,— the first a consequent pole motor adapted to operate on either of two speeds, where the number of poles for one connection is double the number of poles for another connection; and the second a changeable-pole motor employing two sets of windings for operating with different numbers of poles.

The motor shown in Fig. 1 has a rotor 2 and a set of main windings indicated at 4, 6, 8 and 10. The windings 4 and 8 are permanently connected in series between the line leads 12 and 14, and the windings 6 and 10 are connected in series between the line leads 14 and 16. For four-pole operation, the leads 12 and 16 (which may be conveniently termed external leads) are bridged by a connection 18, indicated in dot-and-dash lines, and the lines are connected to the lead 12 and the intermediate lead 14. The poles for the four-pole connection are indicated at N and S, these characters are representing north and south poles at some particular instant. For the eight-pole connection, the bridge 18 is omitted and the lines are connected to the leads 12 and 16. This places all the windings in series with the polarity of windings 6 and 10 reversed as compared to the four-pole connection. This connection gives eight poles, as indicated at N' and S'. The first and fifth poles for the eight-pole connection are coincident with and of the same polarity as the first and third poles of the four-pole connection; the third and seventh poles of the eight-pole connection are coincident with the second and fourth poles of the four-pole connection, but are of opposite polarity.

A starting circuit 26 is connected between the leads 12 and 16. This circuit comprises two windings 28 and 30 which are displaced by an angle A from the windings 4 and 8 respectively. The windings 28 and 30 are wound on the first pair of coincident poles which are of the same polarity for the two connections. A cut-out switch 32 is included in the starting circuit, this switch being preferably an automatic switch of any suitable type adapted to open when the motor comes up to speed. A second starting circuit 34 indicated in dot-and-dash lines may be used if desired, although for most purposes it is unnecessary. This second starting circuit comprises two windings 36 and 38 displaced respectively from the windings 6 and 10 by the same angle A. These windings are therefore wound on the second pair of coincident poles which are of opposite polarities for the two connections. A cut-out switch 40 is also included in the circuit 34. Each starting circuit has a different time constant (i. e., a different ratio of resistance to reactance) from the main winding.

Although the actual angular displacement between the main and starting windings is fixed, it will be noted that the displacement as measured in electrical degrees is twice as great for the eight-pole connection as for the four-pole connection.

The operation of the motor will be described by first assuming a single starting circuit 26 in use. For the eight-pole connection, the starting circuit 26 is connected directly across the line and since it carries a current which is displaced both in space and time from the current in the main winding, a rotating magnetic field is produced. The windings 28 and 30 form poles of the same polarity as the windings 4 and 8. For the four-pole connection, the starting circuit 26 is closed upon itself through the leads 12 and 16 and the bridge 18. The starting circuit is therefore not energized from the line but is energized by transformer action from the windings 4 and 8. The starting torque depends largely upon the magnitude of the displacement angle A. With small displacements, the currents induced in the starting circuit are large but the flux thereby set up may not be sufficiently displaced from the main flux. For large displacements, the flux direction is visible but the transformer action which varies as the cosine of the angle may be too small. Any displacement greater than zero and smaller than 90° will produce some starting torque. It is to be noted, however, that the displacement should not be greater than 45° for the four-pole connection, otherwise it will be greater than 90° for the eight-pole connection, thus producing a starting torque in the opposite direction. Because of the dependence upon transformer action for starting on the four-pole connection, relatively small displacements in the neighborhood of 15° are preferred. This gives 30° displacement on the eight-pole connection which is satisfactory for producing high starting torque by direct energization of the windings from the lines.

It will be noted for either the four-pole or eight-pole connection, the windings 28 and 30 have the same polarity, since they are associated with the windings 4 and 8.

The starting circuit 34, if used, increases the starting torque somewhat. For loads requiring a low starting torque, however, such as fan loads, this additional starting circuit 34 is unnecessary. Both the windings 36 and 38 of the additional starting circuit have the same polarity as the windings 6 and 10, whether connected for the four-pole or the eight-pole operation. The starting circuits 28 and 34 operate identically with the exception that the windings of the former are always of the same polarity, but the windings of the latter are changed in polarity in changing from one connection to the other. In any case, however, the two windings in each circuit have the same polarity.

As the motor comes up to speed, the cut-out switch 32, and the switch 40, if used, are opened and the motor operates as a single phase induction for either connection of the windings. It will be seen that the construction is simple because only three leads are brought out and the change of speed is easily effected by changing the external connections.

The motor shown in Fig. 2 is adapted to operate with either four or six poles, and to this end, two sets of windings are employed. These sets are indicated at 42 and 44, the former being four-pole windings having the instantaneous poles N, S and the latter being six-pole windings having the instantaneous poles N', S'. The line lead 46 connects with both sets and separate leads 48 and 50 are connected to the sets 42 and 44 respectively.

It will be noted that the two sets of windings have coincident poles, that is, the first poles of both sets coincide in position, as do also the third pole of the set 42 and the fourth pole of the set 44, although the polarities in the latter case are opposite. Two starting windings 52 and 54 are provided and are displaced by an angle A from the coincident poles of the main winding. Inasmuch as the windings 52 and 54 are of the same polarity for the four-pole connection but of opposite polarities for the six-pole connection, they are included in separate starting circuits. The winding 52 connects by a wire 56 with a contact 58 of a cut-out switch 59 and the winding 54 connects by a wire 60 with another fixed contact 62 of the switch. The movable contact 64 of the switch connects with a common connection 66 between the windings.

It will be noted that the angle A as measured in electrical degrees is one and one-half times as great for the six-pole connection as for the four-pole connection. The starting windings are energized by transformer action for both connections and hence the displacement must be greater than zero and less than 90° for the six-pole connection and therefore less than 60° for the four-pole connection. As in the motor of Fig. 1, a displacement of 10 to 20° is satisfactory.

For the four-pole connection, the lines are connected to the leads 46 and 48. Voltages are induced in the starting windings 52 and 54 by transformer action. These voltages are in series in the closed circuit formed by the connections 56, 60 and 62. For the six-pole connection, the voltages induced in the starting windings 52 and 54 oppose each other so that the currents flow through their separate closed circuits. In either case, as the motor comes up to speed, the cut-out switch opens to permit operation of the main winding alone.

It will be understood that although the sets of windings in the motor of Fig. 2 have been described as having two coincident poles, exact coincidence of position is not essential, so long as the two sets of windings have one or more poles with axes in sufficiently near the same position to effect proper energization of the starting circuits for either connection. Moreover, although the windings have been shown as embodied in a motor for four and six-pole operation, this arrangement of windings is not essential, and the invention may be embodied in a motor wound for other numbers of poles, so long as one or more coincident poles are produced for the different connections.

Having thus described the invention, what is claimed is:

1. A changeable pole induction motor having, in combination, main windings wound for selective connection to form different numbers of poles, including at least one substantially coincident pole for the different connections, and a starting winding displaced in space from the main winding and having a polar axis displaced from the axis of said coincident pole and arranged to produce starting torque in the same direction irrespective of the main winding connections.

2. A changeable pole induction motor having, in combination, main windings adapted for connection for different numbers of poles, including substantially coincident poles for the different connections, starting windings having polar axes similarly displaced from the axes of said coincident poles, and means for energizing the starting windings.

3. A changeable pole induction motor having, in combination, a set of main windings constructed and arranged to be connected for different numbers of poles, and a starting circuit having a winding displaced from the main winding and having a polar axis displaced from the axis of said coincident pole and arranged to produce starting torque in the same direction irrespective of the main winding connections.

4. A changeable pole induction motor having, in combination, a set of main windings wound for selective connection to form either alternate or consequent poles, including at least one pole having substantially the same axis for different connections, and a starting winding having a polar axis displaced from the axis of said coincident pole and arranged to produce starting torque in the same direction irrespective of the main winding connections.

5. A changeable pole induction motor having, in combination, a set of main windings arranged and connected to form a definite number of poles, and with reversal of selected windings to double the number of poles, and a starting circuit including windings having the same polarity irrespective of the connection of the main windings and similarly displaced from the main windings.

6. A changeable pole induction motor having, in combination, a set of main windings for selective connection to form a definite number of poles, and with reversal of selected windings to double the number of poles, and a starting circuit including windings having axes slightly displaced from alternate poles for the connection having the smaller number of poles and displaced from the axes thereof.

7. A changeable pole induction motor having, in combination, a set of main windings, means for energizing the windings in series to form a definite number of poles, means for energizing the windings in two parallel groups with the polarity of one group reversed to form half the number of poles, a starting circuit including starting windings having polar axes corresponding to poles having the same instantaneous polarity, means for directly energizing the starting circuit for the connection having the greater number of poles, and by induction from the main windings for the connection having the smaller number of poles.

8. A changeable pole induction motor having, in combination, a set of main windings, two external leads to place the windings in series, an intermediate lead and a connection between the external leads to connect the windings in two parallel groups to halve the number of poles, and a starting circuit connected between the external leads and having a winding with an axis displaced from one of the poles, whereby the starting circuit is energized from the line for the connection for the greater number of poles and is closed on itself for the connection for the smaller number of poles.

9. A changeable pole induction motor having, in combination, a set of main windings, two external leads to place the windings in series, an intermediate lead and a connection between the external leads to connect the windings in two parallel groups to halve the number of poles, and a starting circuit connected between the external leads and having windings with axes displaced from poles which have the same instantaneous polarity, whereby the starting circuit is energized from the line for the connection having the greater number of poles and is closed on itself for the connection having the smaller number of poles.

10. A changeable pole induction motor having, in combination, a set of main windings, two external leads to place the windings in series, an intermediate lead and a connection between the external leads to connect the windings in two parallel groups to halve the number of poles, and a starting circuit connected between the external leads and having windings with axes displaced from alternate poles of the same polarity for the connection having the smaller number of poles, whereby the starting circuit is energized from the line for the connection for the greater number of poles and is closed on itself for the connection for the smaller number of poles.

11. A changeable pole induction motor having, in combination, a set of main windings, two external leads to place the windings in series, an intermediate lead and a connection between the external leads to connect the windings in two parallel groups to halve the number of poles, and a starting circuit connected between the external leads and having windings with axes adjacent to poles which have the same polarity as between themselves and irrespective of the connection for the greater or the smaller number of poles, whereby the starting circuit is energized from the line for the connection for the greater number of poles and is closed on itself for the connection for the smaller number of poles.

12. A changeable pole induction motor having, in combination, a set of main windings, two external leads to place the windings in series, an intermediate lead and a connection between the external leads to connect the windings in two parallel groups to halve the number of poles, a starting circuit connected between the external leads and having a winding with an axis adjacent to one of the poles, whereby the starting circuit is energized from the line for the connection for the greater number of poles and is closed on itself for the connection for the smaller number of poles, and a second starting circuit also connected between the external leads and having a winding of polarity opposite to that of the first starting winding for the connection involving the smaller number of poles.

13. A changeable pole induction motor having, in combination, a set of main windings, two external leads to place the windings in series, an intermediate lead and a connection between the external leads to connect the windings in two parallel groups to halve the number of poles, a starting circuit connected between the external leads and having windings with polar axes adjacent to poles which have the same instantaneous polarity, whereby the starting circuit is energized from the line for the connection for the greater number of poles and is closed on itself for the connection for the smaller number of poles, and a second starting circuit also connected between the external leads with axes adjacent to poles which are opposite in polarity to the poles of the windings of the first starting circuit in the connection for the smaller number of poles.

14. A changeable pole induction motor having, in combination, a set of main windings, two external leads to place the windings in series, an intermediate lead and a connection between the external leads to connect the windings in two parallel groups to halve the number of poles, a starting circuit connected between the external leads and having windings with polar axes adjacent to alternate poles of the same polarity for the connection having the smaller number of poles, whereby the starting circuit is energized from the line for the connection for the greater number of poles and is closed on itself for the connection for the smaller number of poles, and another starting circuit including windings with polar axes adjacent to other alternate poles of the connection for the smaller number of poles.

15. A changeable pole induction motor having, in combination, a set of main windings, two external leads to place the windings in series, an intermediate lead and a connection between the external leads to connect the windings in two parallel groups to halve the number of poles, a starting circuit connected between the external leads and having windings with axes adjacent to alternate poles of the same polarity for the connection having the smaller number of poles, whereby the starting circuit is energized from the line for the connection for the greater number of poles and is closed on itself for the connection for the smaller number of poles, and another starting circuit having windings with axes adjacent to poles which are of opposite polarities for the two connections.

16. A changeable pole induction motor having, in combination, a plurality of sets of independent main windings for selective energization for different numbers of poles, at least one pole having substantially the same axis for the several sets of windings, and a starting winding with an axis adjacent to said pole and displaced from the axis thereof.

17. A changeable pole induction motor having, in combination, a plurality of sets of independent main windings for selective energization for different numbers of poles, at least one pole having substantially the same axis for the several sets of windings, and a starting winding with an axis adjacent to said pole and displaced from the axis thereof and energized by induction from the main winding.

18. A changeable pole induction motor having, in combination, a plurality of sets of independent windings for different numbers of poles and forming poles with substantially coincident axes, starting windings with axes adjacent to said coincident poles, and energized by induction, and means for short-circuiting the starting windings.

19. A changeable pole induction motor having, in combination, a plurality of sets of independent main windings for different numbers of poles and forming poles with substantially coincident axes, and starting circuits, each including a starting winding with an axis adjacent to one of said coincident poles.

20. A changeable pole induction motor having, in combination, a plurality of sets of independent windings for different numbers of poles and forming poles with substantially coincident axes, starting windings having polar axes adjacent to said coincident poles, means for placing in series starting windings related to poles of the same polarity, and means for independently short-circuiting starting windings relating to poles of different polarity.

21. A changeable pole induction motor having, in combination, a plurality of sets of independent windings for different numbers of poles and forming poles with substantially coincident axes including a pole of the same polarity and a pole of opposite polarity for both windings, a starting winding for each of said poles, means for short-circuiting the starting windings including a series connection for both windings when of the same polarity, and a connection for isolating the windings when their polarities are opposed.

22. A changeable pole induction motor having, in combination, a plurality of sets of independent windings for different numbers of poles and forming poles with substantially coincident axes including a pole of the same polarity and a pole of opposite polarity for both windings, a starting winding for each of said poles, means for short-circuiting the starting windings including a series connection for both windings when of the same polarity, a connection for isolating the windings when their polarities are opposed, and cut-out switch means for rendering the starting windings inactive.

In testimony whereof I have signed my name to this specification.

CARLTON L. KENNEDY.